(12) United States Patent
Freeman et al.

(10) Patent No.: US 8,230,231 B2
(45) Date of Patent: Jul. 24, 2012

(54) ONE TIME PASSWORD KEY RING FOR MOBILE COMPUTING DEVICE

(75) Inventors: Trevor William Freeman, Sammamish, WA (US); Josh Benaloh, Redmond, WA (US); K John Biccum, Bellevue, WA (US); Atul Kumar Shah, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 12/423,163

(22) Filed: Apr. 14, 2009

(65) Prior Publication Data

US 2010/0262834 A1    Oct. 14, 2010

(51) Int. Cl.
  *H04L 29/06*    (2006.01)
(52) U.S. Cl. ............ 713/184; 713/169; 713/185; 726/9; 726/28; 380/44
(58) Field of Classification Search .......... 713/150–194; 726/1–36; 380/44
  See application file for complete search history.

(56) References Cited

U.S. PATENT DOCUMENTS

| | | | | |
|---|---|---|---|---|
| 4,599,489 A * | 7/1986 | Cargile | ............................ | 705/52 |
| 4,731,841 A * | 3/1988 | Rosen et al. | .................. | 713/159 |
| 5,774,551 A * | 6/1998 | Wu et al. | ........................ | 713/155 |
| 6,480,958 B1 * | 11/2002 | Harrington | .................... | 713/184 |
| 6,950,948 B2 * | 9/2005 | Neff | ................................. | 705/12 |
| 6,980,660 B1 * | 12/2005 | Hind et al. | ..................... | 380/282 |
| 7,409,560 B2 * | 8/2008 | Mori | ............................... | 713/189 |
| 7,549,048 B2 * | 6/2009 | Freeman et al. | .............. | 713/171 |
| 7,606,560 B2 * | 10/2009 | Labrou et al. | .................. | 455/411 |
| 2001/0012361 A1 * | 8/2001 | Kasahara | ........................ | 380/30 |
| 2002/0046189 A1 * | 4/2002 | Morita et al. | .................... | 705/67 |
| 2002/0103765 A1 * | 8/2002 | Ohmori | ........................... | 705/67 |
| 2002/0164035 A1 * | 11/2002 | Yokota et al. | ................. | 380/278 |
| 2003/0154376 A1 * | 8/2003 | Hwangbo | ....................... | 713/173 |
| 2005/0089173 A1 * | 4/2005 | Harrison et al. | .............. | 380/277 |
| 2006/0036850 A1 * | 2/2006 | Enokida | ......................... | 713/156 |
| 2006/0083228 A1 * | 4/2006 | Ong et al. | ...................... | 370/389 |
| 2007/0118886 A1 * | 5/2007 | Martin | ............................... | 726/5 |
| 2008/0005026 A1 * | 1/2008 | Cross et al. | ...................... | 705/51 |
| 2008/0072060 A1 * | 3/2008 | Cannon et al. | ................ | 713/185 |
| 2009/0164774 A1 * | 6/2009 | Sherkin | ......................... | 713/155 |
| 2009/0225988 A1 * | 9/2009 | Yamazaki | ...................... | 380/278 |
| 2010/0107229 A1 * | 4/2010 | Najafi et al. | ....................... | 726/6 |

(Continued)

OTHER PUBLICATIONS

Andrew Tannenbaum, Computer Networks, 2003, Prentice Hall, Fourth Edition, 766, 786, 787, 798.*

(Continued)

*Primary Examiner* — Nathan Flynn
*Assistant Examiner* — Sarah Su

(57) ABSTRACT

Single-use character combinations are a secure mechanism for user authentication. Such "one-time passwords" (OTPs) can be generated by a mobile device to which the user otherwise maintains easy access. A key exchange, such as in accordance with the Diffie-Hellman algorithm, can provide both the mobile device and a server with a shared secret from which the OTPs can be generated. The shared secret can be derived from parameters posted on the server and updated periodically, and the mobile device can obtain such parameters from the server before generating an OTP. Such parameters can also specify the type of OTP mechanism to be utilized. A second site can, independently, establish an OTP mechanism with the mobile device. For efficiency, the first server can provide an identity token which provides the mobile device's public key in a trusted manner, enabling more efficient generation of the shared secret with the second server.

20 Claims, 10 Drawing Sheets

U.S. PATENT DOCUMENTS

| | | | |
|---|---|---|---|
| 2010/0180328 A1* | 7/2010 | Moas et al. | 726/6 |
| 2011/0185405 A1* | 7/2011 | Ganesan | 726/6 |
| 2011/0197266 A1* | 8/2011 | Chu et al. | 726/5 |

OTHER PUBLICATIONS

Leslie Lamport, Password Authentication with Insecure Communication, Pub: Nov. 1, 1981.*

RSA, RSA SecurIDA 700 Identicator, Published: Jan. 1, 2009.*

N. Hailer, The S/KEY One-Time Password System, Published: Feb. 1995.*

Advanced Security Mechanisms for Machine Readable Travels Docs, Pub: Feb. 8, 2006.*

"RSA Secure ID is available on mobile phone", retrieved at <<http://www.rsa.com/node.aspx?id=1313>>, Apr. 14, 2009, pp. 2.

"Five Bar Gate", retrieved at <<http://www.fivebargate.co.za/Default.aspx>>, Apr. 14, 2009, p. 1.

Hallsteinsen, et al., "Using the mobile phone as a security token for unified authentication", Second International Conference on Systems and Networks Communications, retrieved at <<http://ieeexplore.ieee.org/stamp/stamp.jsp?arnumber=04300040>>, Aug. 25-31, 2007, p. 1.

"1 KEY", "IPhone OTP application", retrieved at <<http://www.rho.cc/1Key/>>, Apr. 14, 2009, p. 1.

* cited by examiner

ONE TIME PASSWORD KEY RING FOR MOBILE COMPUTING DEVICE

BACKGROUND

As network communications between computing devices become ubiquitous, users of those computing devices will increasingly perform financial, medical, and other private tasks via such network communications. To protect users, and their private, or otherwise sensitive, information from other, potentially malicious, users, the providers of such services generally require that users verify their identity prior to providing the requested services. Traditionally, a user of a computing device verifies their identity to a remote application, process, or service, through a user identifier, such as a user name, and a password or other secret presumed to be known only by the user and the entity to which the user is attempting to verify their identity. The provision of such a secret is, traditionally, considered to be proof that the user claiming to be the individual identified by the user name, is, in fact, that individual.

Unfortunately, users tend to use both the same identifier and the same secret, such as a password, for multiple service providers. For example, users are often identified by their email address, or their given name, and, in each case, users generally have only one email address or given name that they use. Similarly, to aid their recollection of the secret, users tend to pick the same password for multiple registrations with service providers. In such cases, should a malicious entity obtain a user's password, or other secret, that malicious entity may easily be able to access private and sensitive information about the user from multiple sources, including financial information, medical information, and other like information that can be damaging to the user, or used against the user's best interests.

To protect against such actions by malicious entities, users are often encouraged to select passwords or other secrets that are difficult to obtain through inappropriate means, such as passwords with many characters and numerals, passwords that do not conform to linguistic rules, and other like password selection strategies. Unfortunately, users often ignore such encouragements and select passwords that can be easily guessed or derived, such as words, names, significant dates, or other like data. Users that do select, or are forced to use, secrets that are more difficult to guess or derive find that such secrets are also difficult to remember. Consequently, the user is either likely to decrease their use of the provided service that is protected by such a secret, or they write their secret down, or retain it in another unsecure manner, again rendering it capable of being easily accessed by malicious entities.

In enterprises that often deal with sensitive information that must be kept secure, external hardware devices with a display were produced that could generate, based on a predetermined cryptographic scheme, single use passwords that were both essentially impossible to derive without prior knowledge of the cryptographic scheme, and which, since they were single use, were useless if intercepted and attempted to be used again. The user was provided with such an external hardware device and, when prompted, such as through network communications, to identify themselves, the user would provide identifying information and whatever single use password was displayed by this external hardware device. The receiving entity could confirm the single use password by independently deriving it based on the particular cryptographic scheme being used by the external hardware device provided to that particular user. More specifically, the entity that would ultimately receive these single use passwords and, thereby, provide the user with access to the sensitive information, was the same entity that would provision the external hardware device prior to providing the device to the user. Both the device and the entity were programmed with the same cryptographic scheme, the device was programmatically associated with the user, and then the device was provided to the user through a secure channel, such as by requiring the user to physically present themselves and obtain the device.

SUMMARY

A mobile communication computing device that is already owned by a user, such as a cellular telephone or personal digital assistant, can act as a One Time Password (OTP) device that can generate single use combinations of alphabetic, numeric or alphanumeric characters that can be provided to a remote entity over a network to enable the user to authenticate their identity to such a recipient. Individual providers of services that require the transmission of sensitive or secure information over a network can provide information, and implement mechanisms, that can provide for the establishing of cryptographic methodologies by which both the service provider and the user's mobile computing device can generate identical single use passwords that can be utilized to authenticate the user's identity in a secure manner.

In one embodiment, a shared secret between a user's mobile computing device and one or more networked providers of services can be established through known cryptographic protocols, such as the Diffie-Hellman protocol. Each provider of service can host, on their site, parameters that can be obtained by the user's mobile computing device and used in the generation of a shared secret that is specific and unique to each provider of service.

In another embodiment, each provider of service can update, on their site, parameters that are utilized in the establishment of the shared secret. The user's mobile computing device can access such parameters if the cached parameters are too old, and can base further derivations of the singe use password on such updated parameters.

In a further embodiment, the user can, through their account with the provider of services, request the establishment of an OTP device. The provider of services can generate a registration code that can be provided to the user's mobile computing device. The mobile computing device can then utilize the registration code when providing cryptographic parameters back to the provider of services.

In a still further embodiment, the user's mobile computing device can establish communication with a computing device used by the user to access services provided over a network. Such a communicational connection can enable the provision of single use passwords from the mobile computing device to the computing device being utilized by the user without burdening the user. Such a communicational connection can further aid in the derivation of the shared secret between the provider of the services being accessed over a network and the user's mobile computing device.

In a yet further embodiment, once one provider of services has established a shared secret with the user's mobile computing device, such a provider of services can provide a collection of information, such as a token, that can then be presented to other providers of services to render the independent establishment of a shared secret with such other providers more efficient.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
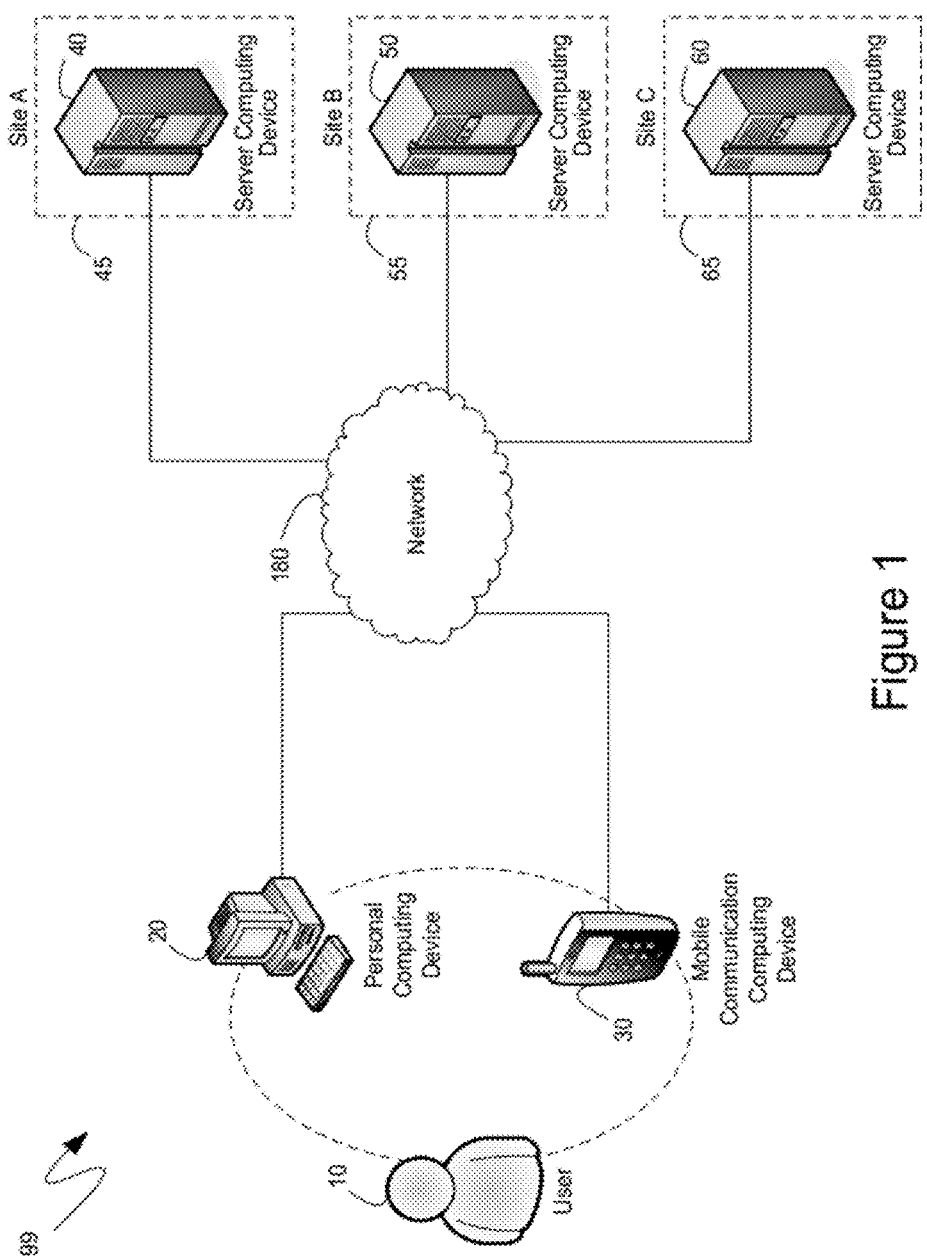
FIG. 1 is a diagram of an exemplary environment within which a mobile communication computing device providing single use secrets can be utilized.

The following description relates to the provision and utilization of mechanisms that can generate single use alphabetic, numeric or alphanumeric character combinations that can be utilized to authenticate the identity of a user to a remote entity. A mobile communication computing device can be used to generate the single use combinations of characters after establishing a shared secret with a remote entity. The shared secret can be established via known cryptographic protocols, such as a Diffie-Hellman key exchange. To link initial communications from the mobile computing device to the user, the remote entity can provide the user with a registration code that can be subsequently utilized by the mobile computing device when providing initial information to the remote entity. Alternatively, the remote computing device can provide a data packet, such as a token, from another remote entity with which it has already registered to enable more efficient establishment of a shared secret with the first remote entity. Once established, the shared secret can be utilized by the mobile computing device to generate single use combinations of characters that can be either automatically or manually entered and provided to remote entities to authenticate the identity of the user to those entities.

The techniques described herein focus on the generation and utilization of what are colloquially known as One Time Passwords (OTPs). The mechanisms described, however, can be equally utilized, without modification, to generate combinations of alphabetic, numeric, or alphanumeric characters, or other information representation symbols, for any purpose, not merely that of traditional "passwords". Consequently, reference to the terms "password" and "One Time Passwords" is meant to include traditional passwords, but is likewise meant to include any secret by which a users identity can be verified or otherwise authenticated.

Additionally, the techniques described herein focus on, but are not limited to, the utilization of OTPs within the context of network sites. Thus, while the below descriptions can most easily be understood within the context of sites, such as web sites, on a large computing network, such as the Internet, the mechanisms described are not so limited. Indeed, without modification, the mechanisms described can provide for the authentication of a user to any entity across a computing network, especially within the context of an interface presented to the user across the network. As such, references to "sites" are meant to include the ubiquitous web sites, but are also meant to refer to any entity, or any one or more server computing devices, that provide, enable, or aid in the provision of goods or services at least partially through, or as a result of, network communications.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary network environment 99 is illustrated, comprising a network 180 having communicationally connected to it a personal computing device 20, a mobile communication computing device 30, and multiple server computing devices 40, 50 and 60. For purposes of the descriptions below, each of the server computing devices 40, 50 and 60 is illustrated as being part of a different site, namely sites 45, 55 and 65, respectively. As will be known by those skilled in the art, however, a site, such as the sites 45, 55 and 65, traditionally will comprise multiple server computing devices or, alternatively, multiple sites can be hosted by a single server computing device, or the same combination of server computing devices, such as in a virtual server arrangement. Consequently, references below to a server computing device, such as the server computing devices 40, 50 and 60, are meant to refer to any one or more physical or virtual servers.

A user 10 can have access to a personal computing device 20 for generating and receiving communications to and from one or more of the server computing devices 40, 50 and 60. More specifically, the personal computing device 20 can execute one or more network-centric application programs, or other components of computer-executable instructions, that can send and receive data to and from the server computing devices 40, 50 and 60, and provide appropriate interfaces to the user 10 through which the user can interact with the server computing devices. As one example, though, as indicated, the below descriptions are not so limited, the personal computing device 20 can execute a web browser application program that can communicate with one or more websites to display web pages hosted by those sites and enable the user 10 to interact with those sites through the displayed web pages and other like display elements.

The user 10 can also have access to a mobile communication computing device 30, which can be a cellular telephone, a personal digital assistant, a netbook, or any other type of portable device that comprises both the ability to establish an independent connection to the network 180, and which comprises sufficient computational capability to implement the below described mechanisms. Although the mechanisms described below are equally applicable to any such mobile communication computing device 30, in one embodiment, the mobile communication computing device can be a cellular telephone to take advantage of the ubiquity of such devices. In particular, a large majority of the users 10 of sites, such as the sites 45, 55 and 65, either carry a cellular telephone with them or have easy and almost immediate access to one while interacting with such sites. Consequently, such a cellular telephone can provide the user 10 with the benefits of single use, cryptographically strong and secure passwords without requiring the user to burden themselves with additional hardware. For ease of reference, the mobile communication computing device 30 may be referred to using the shorthand "mobile device" or "mobile computing device".

Figure 2:
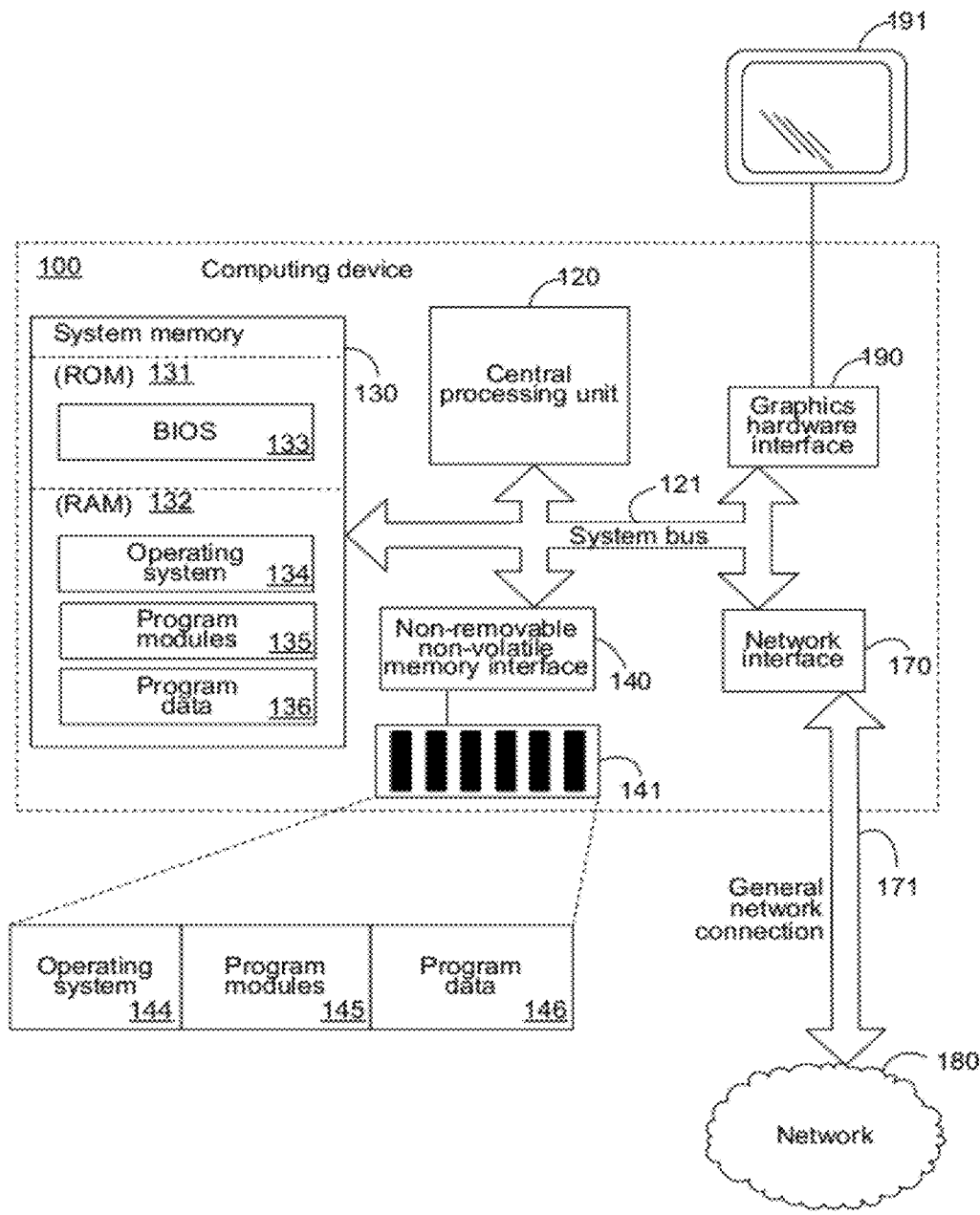
FIG. 2 is a block diagram of an exemplary computing device.

While differing in computational ability and in specific configurations and peripherals, the personal computing device 20, the mobile communication computing device 30 and the server computing devices 40, 50 and 60 can all share common elements. For purposes of establishing a basis for the descriptions below, FIG. 2 illustrates an exemplary computing device 100 which can be any one of the personal computing device, mobile communication computing device or the server computing devices. The exemplary computing device 100 of FIG. 2 includes, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, or a local bus using any of a variety of bus architectures. The computing device 100 can optionally include graphics hardware, including, but not limited to, a graphics hardware interface 190 and a display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a solid state storage 141 that reads from or writes to non-removable, non-volatile solid state memory media. Other removable/non-removable, volatile/nonvolatile computer storage media that can be used with the exemplary computing device include, but are not limited to, magnetic storage media, such as hard disk drives, magnetic tape cassettes, flash memory cards, digital versatile disks, digital video tape, solid state RAM, solid state ROM, and the like. The solid state storage 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, the solid state storage 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For example, the computing device 100 is shown in FIG. 2 to be connected to the network 180 via a general network connection 171 that can be a local area network (LAN), a wide area network (WAN) or other network connection. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
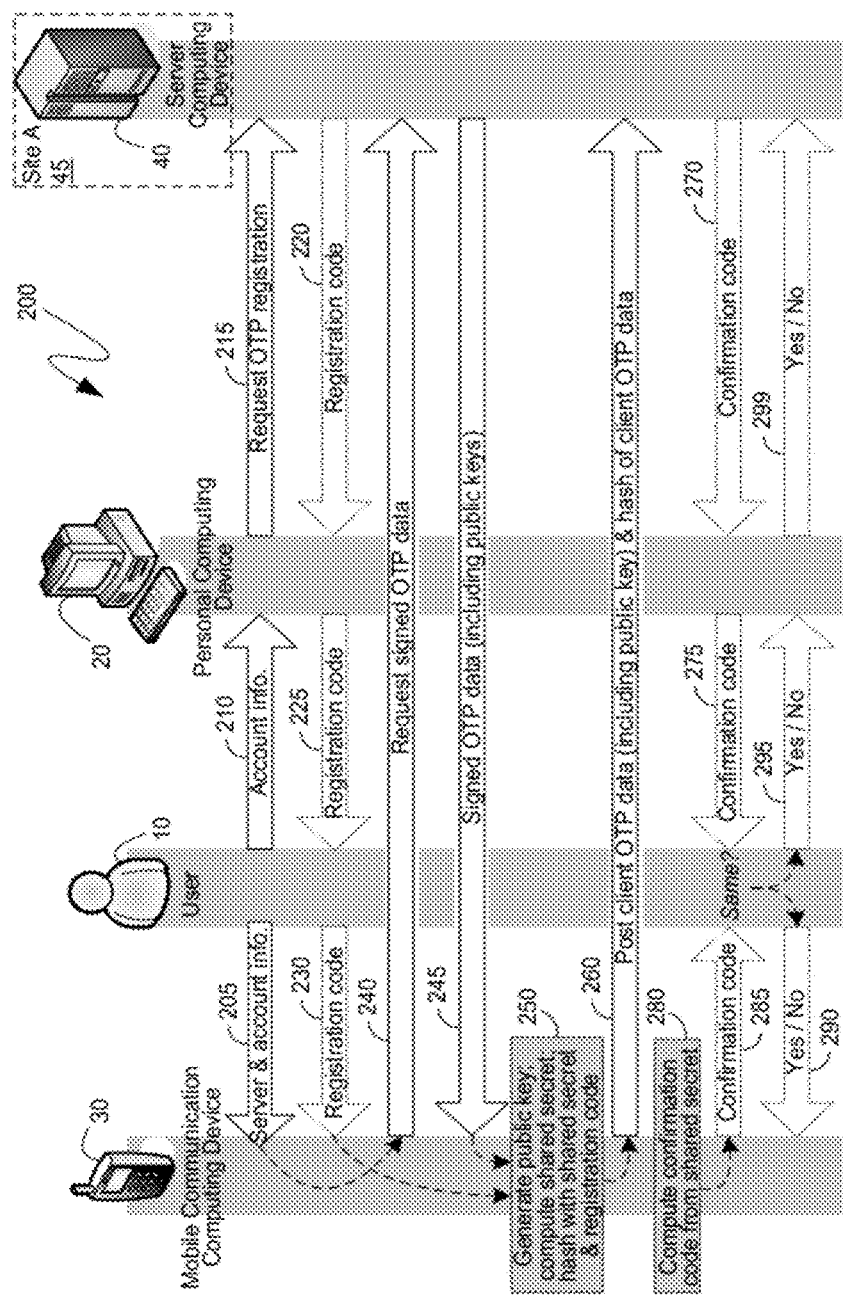
FIG. 3 is a communicational diagram of an exemplary series of communications by which the generation of single use secrets can be provisioned.

Turning to FIG. 3, the system 200 illustrates the provisioning, according to one embodiment, of the mobile communication computing device 30 to enable it to generate OTPs for the site 45 hosted by the server computing device 40. To provide context for the illustrated communications of the system 200, the user 10 can be using a personal computing device 20 to execute a network-capable application program that enables the user to interact with the site 45 by communicating with the server computing device 40. In order to utilize the advantages of OTPs, such as increased security and increased convenience, the user 10 can request, via the application program executing on the personal computing device 20, that the site 45 enable the user to utilize an external device, such as the mobile communication computing device 30, to generate OTPs that the site 45 will accept as a verification of the user's identity.

Such a request can comprise the provision of account information 210 by the user 10 to the application executing on the personal computing device 20. The provision of account information 210 can be the user 10 entering relevant account information, including, for example, a user name, or other identifier, and an existing password, into an interface presented by the networked application program executing on the personal computing device 20 that is communicating with the site 45. Alternatively, the provision of account information 210 can be the user 10 utilizing the interface presented by the application program executing on the personal computing device 20 to create a new account on the site 45.

Upon receiving account information 210 from the user 10, the application executing on the personal computing device 20 can provide relevant account information to the server computing device 40, as well as a request 215 to initiate an OTP registration. For example, if the user 10 already had an account with the site 45, then the relevant account information provided by the application executing on the personal computing device 20 can comprise a user name and password, or other like identifying information, to enable the user to log on to their account. Once the user 10 is logged on, the request 215 for OTP registration can be made. Alternatively, if the user 10 did not previously have an account set up with the site 45, communications between the application executing on the personal computing device 20 and the server computing device 40 can initially be directed to the establishment of that account prior to the sending of the request 215 for OTP registration.

In addition to requesting OTP registration of the site 45, via the application executing on the personal computing device 20 and the subsequent communication therefrom to the server computing device 40, the user 10 can also utilize their mobile device 30 to prepare it for establishing a new OTP key ring entry. As will be described further below, in contemplated embodiments, the mobile device 30 can be utilized to host a key ring that can generate OTPs for multiple sites, such as the site 45. In such a manner, a device that the user 10 often carries with them, such as the mobile device 30, can be a single source of OTPs, thereby providing security in a convenient manner. Thus, much like a traditional key ring comprises multiple different keys on the key ring, the described mechanisms can enable a device to become an analog to such a traditional key ring with the capability of generating OTPs that can act as keys to differing sites, with the OTP generation mechanism for each site being unique to that site and independent of other sites, thereby preventing one site from improperly using or obtaining a "key" associated with another, different site. While many different methods exist for implementing the below described mechanisms on a mobile communication computing device, such as the mobile communication computing device 30, in one embodiment, an application program executing on the mobile communication computing device, such an OTP key ring application, can implement the mechanisms described below. The below descriptions, however, are not so limited, and are meant to cover any other method that is capable of implementing the mechanisms described.

To prepare the mobile device 30 for the addition of a new entry to an OTP key ring, the user 10 can utilize the mobile device, such as, for example, by invoking an OTP key ring application program on the mobile device, and can provide relevant information regarding the new entry. As shown in FIG. 3, the user 10 can provide, to the mobile device 30, the network address of the server computing device 40, or another specification of how to communicate with it, such as a common name for the site 45 through which the server computing device 40 can be reached. The user 10 can also provide, to the mobile device 30, account information to enable the mobile device to associate a subsequently generated shared secret, and other information relevant to the generation of OTPs, with a particular account. The provision of information, such as the server's information and the user's account information, can be provided via communication 205, as shown.

In one embodiment, to enable the server computing device 40 to associate subsequent communications from the mobile device 30, or other entities, with the account of the user 10, the server can, optionally, generate a registration code and associate it with the user's account when the user requests, such as via communication 215, that the server computing device 40 enable the user to use OTPs as an identification and verification mechanism. The server computing device 40 can then, again, optionally, transmit the registration code to the user 10. In one embodiment, such a transmission of the registration code to the user 10 can occur "out of band". For example, as shown, the registration code can be transmitted from the server computing device 40 to the personal computing device 20 via communication 220, which can be an email, instant message, or other communication mechanism different than that utilized by the communication 215. The user 10 can then obtain, as shown by the arrow 225, the registration code from the personal computing device 20 by using an appropriate application program executing on the personal computing device, such as an email program or an instant message program. Once the user 10 has obtained the registration code, the user can provide it to the mobile device 30, as shown by the arrow 230. When providing the registration code to the mobile device 30, the user 10 can specify, or otherwise associate it with, the previously provided server and account information. The communications 220, 225 and 230 are shown in FIG. 3 via dashed lines to indicate that they are optional.

As shown previously in the network environment 99 of FIG. 1, the mobile communication computing device 30 can maintain an independent connection to the network 180. For example, the mobile device 30 can be capable of establishing a connection to the network 180 via cellular communication, wireless communication, or other like methodologies. Consequently, and returning to FIG. 3, the mobile device 30, once the user 10 has provided information regarding the server computing device 40, can independently communicate with the server computing device and can, independently, obtain information from it. As shown in the system 200, the mobile device 30 can request signed OTP data, via request 240, from the server computing device 40. In response 245, the server computing device 40 can provide the signed OTP data, including the server's public keys, to the mobile device 30.

In one embodiment, the server computing device 40 can host, or otherwise provide for downloading, information relevant to the derivation of OTPs. For example, the server can make available its public keys. As will be known by those skilled in the art, the generation of public and private keys, such as in accordance with the well-known Diffie-Hellman protocol, can be based on a prime number and a primitive root. Specific prime numbers and primitive roots have already been found to yield public and private keys that provide for acceptable levels of cryptographic security. As will be known by those skilled in the art, particular combinations of such specific prime numbers and primitive roots are known as Oakley groups. Thus, in one embodiment, the server computing device 40 can host and make available for downloading over the network 180 (not shown), specific Oakley groups that it supports and the corresponding public keys of the server computing device that were generated from those Oakley groups, or are otherwise associated with them. To the extent that additional information may also be relevant to the deviation of a shared secret, or to the extent that a different protocol, other than the Diffie-Hellman protocol, is utilized, the server computing device 40 can host additional such information in an equivalent manner.

The hosted data relevant to the derivation of a shared secret for OTP purposes can be signed by the server computing device 40 to provide a measure of protection against tampering by malicious entities. For example, the server computing device 40, in addition to hosting the above described data, can also provide a hash of the above data, such as a hash generated from the server's private key. In such a manner, recipients or obtainers of the above described data can verify its integrity, namely that it is, in fact, the data as provided by the server 40. Other similar cryptographic verification mechanisms can likewise be utilized.

Upon obtaining the OTP data from the communication 245, the mobile device 30 can select from among any alternatives presented in the OTP data. For example, if the OTP data comprises multiple Oakley groups, the mobile device 30 can select an Oakley group that it is capable of supporting. Similarly, if other alternatives were presented in the OTP data, the mobile device 30 can select a supported alternative, if one was presented. In some cases, the presented alternatives will have associated data of which the mobile device 30 should be aware. For example, when selecting an Oakley group, the mobile device 30 can be aware of which of the server's public keys is associated with the selected Oakley group, and the mobile device can, thereafter, treat that public key as the public key of the server computing device 40 for purposes of establishing a common OTP derivation mechanism.

Once the mobile device 30 selects an Oakley group, or similar set of data that was presented in the alternative in the OTP data, it can, as illustrated by the activity 250, generate its own public key from the selected data. For example, as will be known by those skilled in the art, under the Diffie-Hellman protocol, when the mobile device 30 selects a prime number and a primitive root, it can generate its public key by raising the primitive root to a power equal to a randomly selected value that acts as the mobile device's private key, and then taking, as the public key, the remainder when the resulting value is divided by the selected prime number. In mathematical notation, if the prime number is designated by the variable "p" and the primitive root by the variable "g", and if the randomly selected value that acts as the mobile device's private key is designated by the variable "a", then the mobile device 30 can, again by the Diffie-Hellman algorithm, calculate its public key, designated by the variable "A", as follows: $A = g^a \bmod p$.

As indicated by the activity 250, the mobile device 30 can further calculate a shared secret from the private key that it used in deriving a public key and from the public key that was provided by the server computing device 40 in the communication 245. For example, using the Diffie-Hellman protocol for deriving a shared secret between two parties, the mobile device 30 can derive a shared secret by raising the selected primitive root to a power equal to the selected public key of the server computing device 40 and then taking the remainder when the resulting value is divided by the selected prime number and raising that remainder to a power equal to the mobile device's private key and, finally, taking the remainder when that resulting value is divided again by the selected prime number. In mathematical notation, keeping the variables "p", "g", and "a" to reference, respectively, the selected prime number, the selected primitive root and the random value being utilized as the mobile device's private key, and using the variable "B" to represent the public key of the server computing device 40 that is associated with the selected prime number and primitive root, the mobile device 30 can, by the Diffie-Hellman protocol of deriving a shared secret, calculate that shared secret, designated by the variable "z", as follows:

$$z = (g^B \bmod p)^a \bmod p.$$

In one embodiment, the server computing device 40 can also calculate the same shared secret calculated by the mobile device 30 without transmitting or receiving anything other than publicly available information. For example, according to the Diffie-Hellman protocol of deriving a shared secret, the same shared secret "z" can be calculated by the server computing device 40 by raising the selected primitive root to a power equal to the public key of the mobile device 30 and then taking the remainder when the resulting value is divided by the selected prime number and raising that remainder to a power equal to the server's private key corresponding to the server's public key selected by the mobile device and, finally, taking the remainder when that resulting value is divided again by the selected prime number. In mathematical notation, keeping the variables "p", "g" and "A" to reference, respectively, the prime number and primitive root selected by the mobile device 30 and the mobile device's public key, and using the variable "b" to represent the private key of the server computing device 40 that is associated with the selected prime number and primitive root, the server computing device can, by the Diffie-Hellman protocol of deriving a shared secret, calculate that shared secret, again designated by the variable "z", as follows:

$$z = (g^A \bmod p)^b \bmod p.$$

To enable the server computing device 40 to calculate the shared secret, the mobile device 30 can provide to the server computing device an indication of which information, from among the alternative information presented by the server computing device in the communication 245, the mobile device selected. Thus, for example, the mobile device 30 can provide, to the server computing device 40, an indication of which Oakley group of parameters, such as the prime number and primitive root, it selected. From such information, the server computing device 40 can then identify its private and public keys that are associated with the selected information. In addition, the mobile device 30 can provide, to the server computing device 40, the public key it derived. Such information, and any other information appropriate for the server computing device 40 to possess in order to enable the utilization of OTPs can be posted, or otherwise provided or transmitted, to the server computing device by communication 260.

Communication 260 can further comprise a hash of the client OTP data to aid the server computing device 40 in associating the response with an existing account and to aid the server computing device in avoiding the wasting of computational energy on malicious or erroneously posted client OTP data. For example, in one embodiment, the mobile device 30 can hash the posted OTP data based on a combination, such as a concatenation, of the calculated shared secret and the registration code received from the server computing device 40 via communications 220, 225 and 230. If the optional registration code was not provided, the mobile device 30 can hash the posted OTP data with the shared secret. The server computing device 40 can then, upon receipt of the communication 260, verify the hash by independently calculating the shared secret, retrieving the registration code associated with the account of the user 10 that it transmitted via communication 220, if appropriate, and then independently calculating the hash. If the hash value as calculated by the server computing device 40 matches that sent by the mobile device 30 via communication 260, then the server computing device can proceed with the establishment of the use of OTPs for the user 10. If the hash value as calculated by the server computing device 40 does not match that sent by the mobile device 30, then the mobile device, or whatever device actually sent communication 260, has not proven to the server computing device that it is, actually, in possession of the mobile device's shared secret and, consequently, the server computing device can discard the received information and, in one embodiment, abandon further efforts to establish the use of OTPs for the user 10.

As indicated previously, to calculate the shared secret, the server computing device 40 can utilize the values of the prime number and primitive root selected by the mobile device 30, the private key of the server computing device corresponding to those values and the public key of the mobile device. The selected prime number and primitive root, as well as the public key of the mobile device 30, can have been part of the client OTP data transmitted with the communication 260 such that, once the server computing device 40 has verified the client OTP data, it can derive the shared secret.

The One Time Passwords generated by the mobile device 30, and accepted by the server computing device 40 can be based on the shared secret. For example, the OTPs can be time based, such that they are derived from the shared secret and the time, as expressed in some agreed-upon manner, at which they were generated. Alternatively, the OTPs can be event based such that they are derived from the shared secret and the value of the current exchange between the mobile device 30 and the server computing device 40 as expressed in an agreed upon manner. As yet another alternative, the OTPs can be challenge-response based, such that they are derived from the shared secret, and from a challenge value issued by, for example, the server computing device 40. In each case, the derivation of the OTP from the input parameters, including the shared secret, can proceed according to known cryptographically sound protocols. Other methods of deriving the OTP from the shared secret can likewise be utilized, as the mechanisms described are independent of whatever OTP derivation mechanism is selected, and operate equally well with all such mechanisms incorporating the shared secret.

The precise manner in which the OTPs are derived from the shared secret can be another item that can be presented, in a listing of acceptable alternatives, by the server computing device 40 as part of the signed OTP data provided via communication 245. The alternatives presented can include, in one embodiment, the time-based, event-based, and challenge-and-response-based OTP derivations described. The mobile device 30 can then select, from among the alternatives presented, and can indicate such a selection as part of the client OTP data provided to the server computing device 40 via the communication 260.

After providing the communication 260, the mobile device 30 can proceed to compute a confirmation code from the shared secret to verify that it, and the server computing device 40, have properly agreed upon, and selected, a mechanism for deriving OTPs. In one embodiment, the confirmation code generated by the activity 280 can be an OTP as would have been generated through normal operation of this aspect of the mobile device 30.

In one embodiment, after receiving and verifying the client OTP data provided via the communication 260, the server computing device 40 can, optionally, proceed to compute a confirmation code from the shared secret to verify that it, and the mobile device 30, have properly agreed upon an OTP mechanism. As before, the confirmation code generated by the server computing device 40 can simply be an OTP. However, because such a confirmation code merely confirms the proper establishment of the already agreed upon OTP mechanism, its generation and transmission can be optional.

After generating the confirmation code, the server computing device 40 can, again, optionally, transmit the confirmation code to the user 10. In one embodiment, to maintain security, the server computing device 40 can transmit the confirmation code to the user 10 "out of band". Consequently, rather than sending the confirmation code to the mobile device 30, or the originator of the communication 260, the server computing device 40 can send it to the user 10 through other channels, such as, for example, through an email to an email address associated with the user's account on the site 45, through an instant message to the user, or through other like out of band channels. Thus, as shown, the server computing device 40 can send a communication 270 to the user 10 that the user can receive through appropriate application programs executing on the personal computing device 20. For example, the user 10 can utilize an email application program executing on the personal computing device 20 to receive the confirmation code if the communication 270 was an email from the server computing device 40. Alternatively, the user 10 can utilize an instant messaging program executing on the computing device 20, or any other appropriate application program.

Once the user 10 is presented the confirmation code by the application executing on the personal computing device 20, such as shown by the arrow 275, the user can reference the mobile device 30 to obtain, from the mobile device, its confirmation code as shown by the arrow 285. The user 10 can then compare the two received confirmation codes to determine if they are equivalent. If the confirmation codes are equivalent, then the user 10 can notify the mobile device 30 and the server computing device 40 so that they can each confirm proper establishment of an OTP mechanism between them. If the confirmation codes are not equivalent, the user 10 can, likewise, notify the mobile device 30 and the server computing device 40 so that the currently derived information can be discarded and a new attempt to establish an OTP mechanism can be performed. The user 10 can notify the mobile device 30 through direct interaction, as illustrated by the arrow 290. On the other hand, the user 10 can utilize a network aware application program executing on the personal computing device 20 to notify the server computing device 40, as illustrated by the arrow 295 and the communication 299 from the personal computing device to the server computing device. As before, communications 270, 275, 285, 290, 295 and 299 are shown in FIG. 3 with dashed lines to indicate that they are optional.

Figure 4:
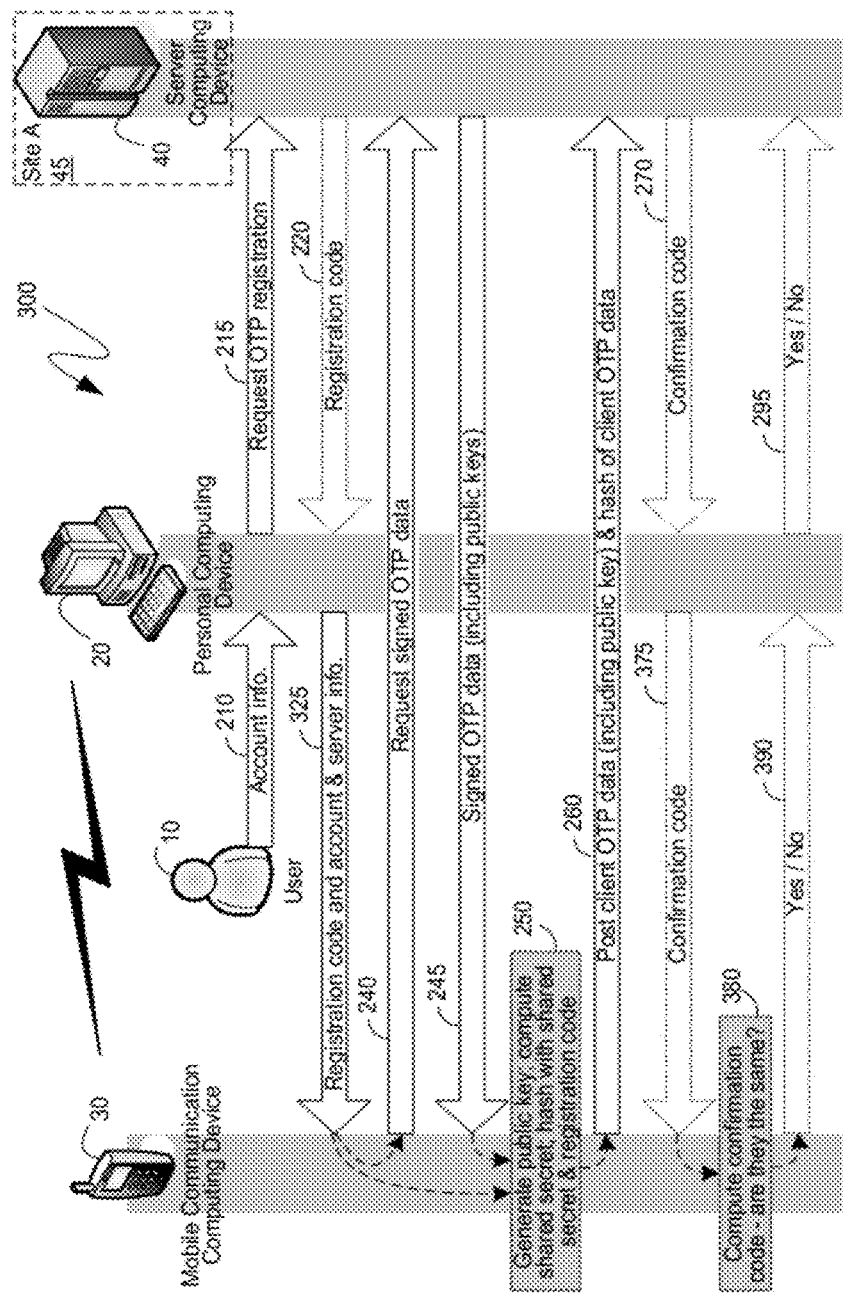
FIG. 4 is a communicational diagram of another exemplary series of communications by which the generation of single use secrets can be provisioned.

In another embodiment, if the mobile communication computing device 30 and the personal computing device 20 are communicationally coupled, such as through a short-range wireless protocol, or through a physical connection supporting a wired protocol, certain efficiencies in the establishment of an OTP mechanism, as described above, can be realized. Turning to FIG. 4, the system 300 illustrates a mobile device 30 communicationally coupled to the personal computing device 20 which is executing one or more application programs with which the user 10 is interacting to communicate with the site 45.

As before, the establishment of an OTP mechanism between the user 10 and the site 45 can commence with account information that can be provided, as illustrated by the arrow 210, by the user to an application program executing on the personal computing device 20, which can, in turn, request OTP registration of the site via the request 215 to the server computing device 40. As also described above, the server computing device 40 can, optionally, respond with the registration code via communication 220. Communication 220 in FIG. 4 is, therefore, shown with dashed lines.

In an embodiment where the mobile device 30 and the personal computing device 20 are communicationally connected, however, the user 10 need not provide any information directly to the mobile device. Instead, as illustrated via communication 325, one or more applications executing on the personal computing device 20 can provide the relevant information to the mobile device 30. For example, upon receipt of the optional registration code via communication 220, applications executing on the personal computing device 20 can provide the network location of the server 40, the account information of the user 10, the registration code, if appropriate, and any other relevant information to the mobile device 30 via the communicational connection between the personal computing device and the mobile device.

The mobile device 30 can then proceed, as illustrated and described above, to request signed OTP data from the server computing device 40 via the communication 240 and can receive such information from the server computing device via the communication 245. Again, as also described above, the mobile device 30 can proceed to generate its public key and calculate the shared secret as part of the activity 250. The mobile device 30 can then send the client OTP data to the server computing device 40, via the communication 260, as before.

While the server computing device 40 can still, as before, optionally compute the confirmation code and send it via communication 270 to the user 10, in an embodiment where the mobile device 30 and the personal computing device 20 are communicationally coupled, the user need not manually compare the confirmation code as generated by the server computing device to that generated by the mobile device. Instead, as shown in the system 300, applications executing on the personal computing device 20 can retrieve the confirmation code sent via communication 270 and automatically provide it, such as via communication 375 to the mobile device 30. The mobile device 30 can then, as part of the activity 380, compare the received confirmation code to that it generated and determine if they are identical. The mobile device 30 can then indicate such via communication 390 to the applications executing on the personal computing device 20, which can, in turn, provide such an indication to the server computing device 40 via communication 295. Communications 270, 375, 390 and 295 are shown in FIG. 4 with dashed lines to indicate that, as above, the utilization and transmission of the confirmation code is merely a confirmation and, as such, is optional.

Alternatively, rather than sending, to the mobile device 30, the confirmation code provided by the server computing device 40 via communication 270, applications executing on the personal computing device 20 can obtain, from the mobile computing device, the confirmation code it computed, and the applications executing on the personal computing device can compare the two and indicate the result to the mobile device and the server computing device. In such a case, the communication 375 illustrated in FIG. 4 could be reversed to provide the mobile device's confirmation code from the mobile device 30 to the applications executing on the personal computing device 20. Similarly, the yes/no indication 390 can likewise be reversed to, instead, provide such an indication from the applications executing on the personal computing device 20 to the mobile device 30. In addition, the comparison aspect of the activity 380 could be performed by the personal computing device 20 instead of the mobile device 30 as shown.

As can be seen, if the mobile device 30 and the personal computing device 20 can establish a communicational connection, specific actions on the part of the user 10 can be eliminated, rendering the establishing of an OTP mechanism between the mobile device and the site 45 more efficient. In yet another embodiment, if the user 10 can physically present the mobile device 30 within close proximity to a personal computing device 20 that can be designed for provisioning OTPs for the site 45, additional efficiencies can be realized. In particular, the close proximity between the mobile device 30 and the personal computing device 20 can enable the utilization of communicational mechanisms, such as very short range wireless communication, or even wired communication, that, due to their physical properties, provide security against interception or eavesdropping by malicious entities.

Figure 5:
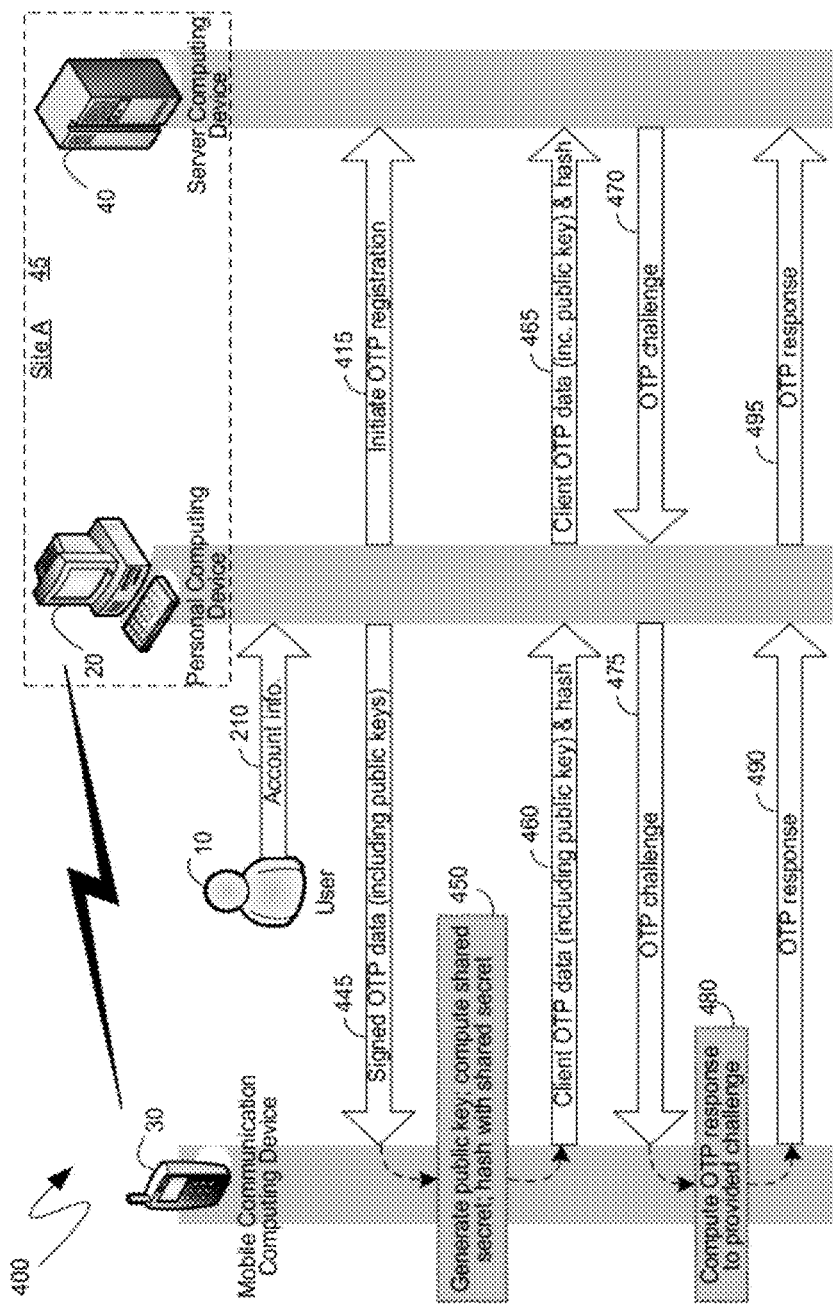
FIG. 5 is a communicational diagram of yet another exemplary series of communications by which the generation of single use secrets can be provisioned.

Turning to FIG. 5, the system 400, as illustrated, comprises a site 45 that can comprise both a server computing device 40 for hosting the site 45 on the network 180 (not shown), and a personal computing device 20 that can be located in an accessible location to enable and encourage the user 10 to present themselves at such a personal computing device, with their mobile device 30, and utilize the personal computing device to provision an OTP mechanism between the mobile device and the site. In one embodiment, as indicated, the illustrated communicational connection between the personal computing device 20 and the mobile device 30 can be a wired connection or a very short range wireless connection to eliminate, in a practical sense, the possibility of interception or reception of communications between the mobile device and the personal computing device.

As before, the user 10 can initiate the OTP provisioning by providing account information to the personal computing device 20 in communication 210. However, in system 400 of FIG. 5, no further communication between the personal computing device 20 and the server computing device 40 need occur, since both are part of the site 45 and, as such, both can have equivalent information, at least with respect to OTP provisioning, such as, for example, user account information. In response to the user's communication 210, the personal computing device 20 can, optionally, inform the server computing device 40, via the communication 415, that an OTP registration for the account of the user 10 has been initiated.

Additionally, the personal computing device 20 can provide, directly to the mobile device 30, the signed OTP data that was previously downloaded by the mobile device from the server computing device 40, since, as indicated previously, the personal computing device is part of the same site 45 as the server computing device and can have stored locally on the personal computing device at least some of the same information, such as the signed OTP data, as is stored on the server computing device. The mobile device 30 can then select appropriate parameters, generate its public key and calculate the shared secret during activity 450 in an equivalent manner to that described in detail above with respect to activity 250. When hashing the client OTP data, however, unlike that described above, that utilized a registration code, the mobile device 30 in the system 400 of FIG. 5 need not concatenate the shared secret with a registration code when hashing the client OTP data, since, as shown, no registration code need be provided by the server computing device 40. Instead, the security provided by the physical nature of the communicational link between the mobile device 30 and the personal computing device 20, in combination with the personal computing device being part of the same site 45 as the server computing device 40, can render the registration code, described above, redundant and, thus, unnecessary.

The client OTP data, such as the parameters selected by the mobile device 30, and the mobile device's public key, as well as the hash of the client OTP data, can be provided, by the mobile device 30 to the personal computing device 20 via communication 460. The personal computing device 20 can then, in turn, via communication 465, provide the same information to the server computing device 40. The server computing device 40 can then, as before, utilize the provided information to derive the shared secret. As indicated previously, methods of generated OTPs from the shared secret can, likewise, be established with the receipt of the client OTP data. Rather than sending a confirmation code, such as in the manner described previously, the server computing device 40 in the system 400 can, instead, provide an OTP challenge to the mobile device 30, which the mobile device can utilize, during activity 480, to compute an OTP response to that challenge. The OTP response can then be provided back to the server computing device 40. If the received OTP response matches that expected by the server computing device 40, the OTP mechanisms can have been established properly.

In one embodiment, to take advantage of existing, physically protected, communicational connection between the mobile device 30 and the personal computing device 20, the server computing device 40 can send the OTP challenge to the mobile device by first providing it to the personal computing device via communication 470 and then having the personal computing device pass it along to the mobile device via communication 475. The mobile device 30 can, likewise, provide the OTP response to the server computing device 40 by first providing it to the personal computing device 20 via communication 490 and then having the personal computing device further provide the OTP response to the server computing device via communication 495. In an alternative embodiment, not shown in FIG. 5, the mobile device 30 and the server computing device 40 can establish an independent communicational connection, such as through the network 180 (not shown), and can exchange the OTP challenge and the OTP response directly, and not through the personal computing device 20.

Figure 6:
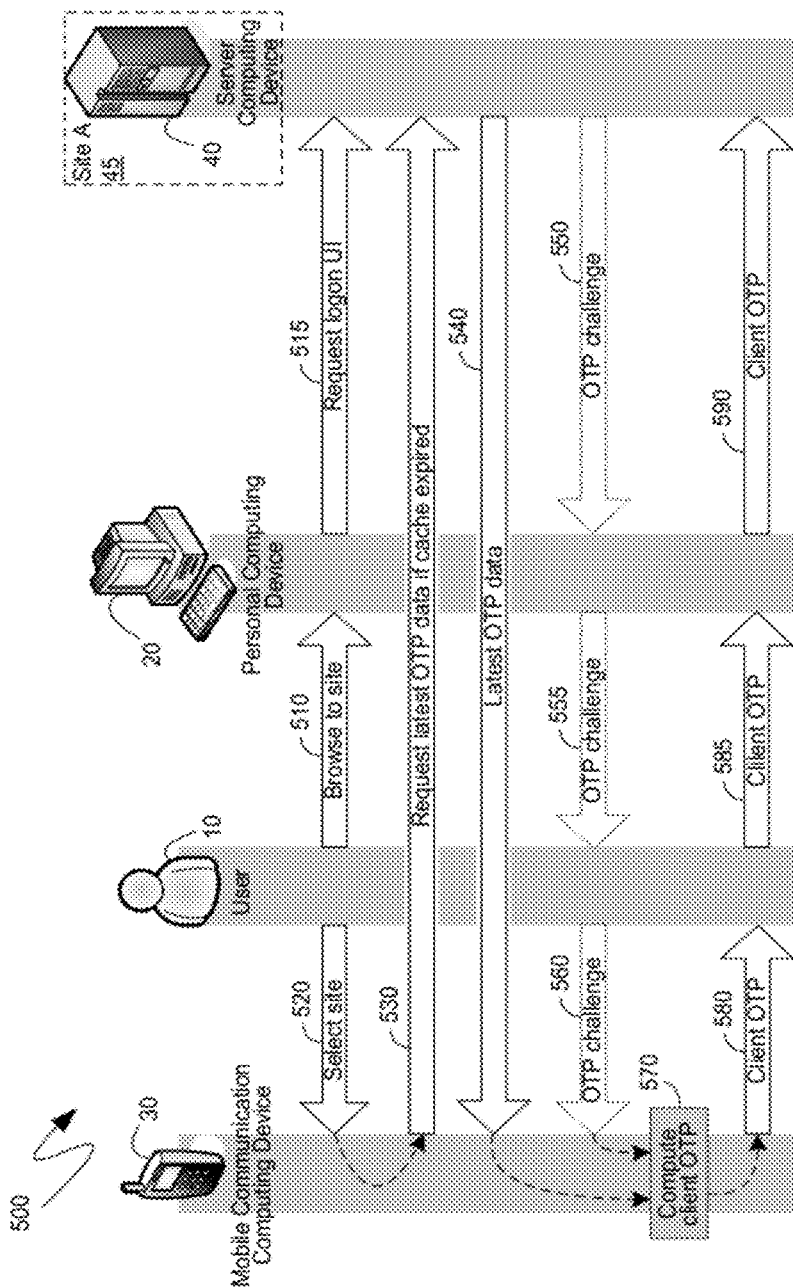
FIG. 6 is a communicational diagram of an exemplary utilization of single use secrets.

Once an OTP mechanism has been provisioned between the user 10, using the mobile device 30, and the site 45, utilizing the server computing device 40, irrespective of which of the above described mechanisms was utilized for the provisioning, the user can proceed to utilize OTPs generated by the mobile device to gain access to the services or information provided by the site. Turning to FIG. 6, the system 500 illustrates one contemplated embodiment by which the user 10 can utilize the mobile device 30 to generate an OTP for accessing the site 45. In the system 500 shown in FIG. 6, the user 10 can be using a personal computing device 20 to execute one or more application programs capable of communication over the network 180 (not shown) to communicate with the site 45 via communications with the server computing device 40. However, the personal computing device 20 need not be communicationally connected to the user's mobile device 30. For example, the personal computing device 20 can be a public computing device, such as at an internet café, an airport lounge, or the like. While traditionally, such public computing devices could pose a security threat, in that they can have been compromised by malicious entities that can monitor actions of the user 10 with respect to the personal computing device 20 and, as a result, they can intercept and, thereby, steal the user's password, the use of OTPs can lessen such a security risk, since, even if such malicious entities were able to steal the password that the user provides to the site 45 through the personal computing device, such a password would be a single use password and would not enable the malicious entities to gain access to the site 45 by providing the same password a subsequent time.

Initially, as shown in the system 500 of FIG. 6, the user 10 can utilize one or more applications executing on the computing device 20 to browse to the site 45, as indicated by the arrow 510. The applications executing on the personal computing device 20 that are being utilized by the user 10 can then communicate with the site 45, such as through the server computing device 40, and can issue request 515 for a logon user interface.

The user 10 can also utilize their mobile device 30, comprising an OTP key ring application that comprises an entry for the site 45, and can inform the mobile device that the user is attempting to access the site 45. For example, the user 10 can notify the mobile device 30 of the site 45 via manual entry 520, which can be via any user interface mechanism provided for by the mobile device. Upon receiving the manual entry 520, the mobile device 30 can independently establish communication with the site 45, such as with the server computing device 40 associated with the site, and can issue request 530 for the latest OTP data. In one embodiment, the request 530 can be issued by the mobile device 30 only if a previously cached version of the OTP data has expired.

The OTP data provided, via communication 540, by the server computing device 40 to the mobile device 30 in response to the request 530 can be analogous to the OTP data provided via communication 245, described in detail above, during the OTP provisioning. More specifically, in one embodiment, the OTP data provided via communication 245 can further comprise information relevant to the derivation of an OTP after an initial provisioning, such as that described above. Such additional data can comprise selection of a different type of OTP mechanism, such as an event-based, time-based, or challenge-response-based mechanism, selection of a different public key for the server computing device 40, and other like information. Alternatively, the OTP data provided via communication 540 can be a different set of data from that provided via communication 245. In such an embodiment, the data provided via communication 540 can be limited to data relevant to the derivation of an OTP after an initial provisioning and, as such, can exclude some of the above described alternative data present in the communication 245. Through such updated OTP data, provided by the communication 540, the server computing device 40 can continually adjust its public key, the OTP mechanism, and other factors affecting the derivation of OTPs valid for the site 45.

As indicated previously, one mechanism for generating OTPs from the shared secret can be based on a challenge-response mechanism where the OTP is generated as a response to a specific challenge. If such a mechanism was agreed upon, or subsequently indicated via the OTP data provided via communication 540, then the server computing device 40 can also provide, to the mobile device 30, an OTP challenge via, at least in part, communication 550. In one embodiment, such a challenge from the server computing device 40 can be initially provided to the application executing on the personal computing device 20 via communication 550. The user 10 can obtain such a challenge through the user interface of the application executing on the personal computing device 20, as indicated via the arrow 555. The user 10 can then provide the challenge to the mobile device 30 via manual entry 560, such as through a keyboard or other user interface element provided by the mobile device 30. The communications 550, 555 and 560 and shown in dashed lines in FIG. 6 to indicate that they are optional and are dependent upon whether the mobile device 30 and the server computing device 40 are utilizing a challenge-response-based OTP generation mechanism.

After receiving the latest OTP data via communication 540, if appropriate, the OTP challenge, if relevant, and recalculating the shared secret, again, if appropriate, the mobile device, as part of the activity 570, can compute an OTP to be utilized by the user 10 at that time to log on to the site 45. The OTP can be provided, by the mobile device 30, to the user 10, as indicated by the arrow 580. In one embodiment, such a providing can occur through audio-visual means, such as by displaying the OTP on a display of the mobile device 30, delivering the OTP through auditory means through a speaker of the mobile device, or another like mechanism. The user 10 can then enter, via entry 585, the provided OTP into the application program executing on the personal computing device 20 which the user is using to communicate with the site 45. The application program executing on the personal computing device 20 can then provide the OTP to the server computing device 40 via communication 590 in the same manner as it would any other password, or like secret, provided by the user 10. The server computing device 40 can verify the provided OTP and, if it is verified as a proper OTP, the site 45 can log the user 10 onto the site.

Figure 7:
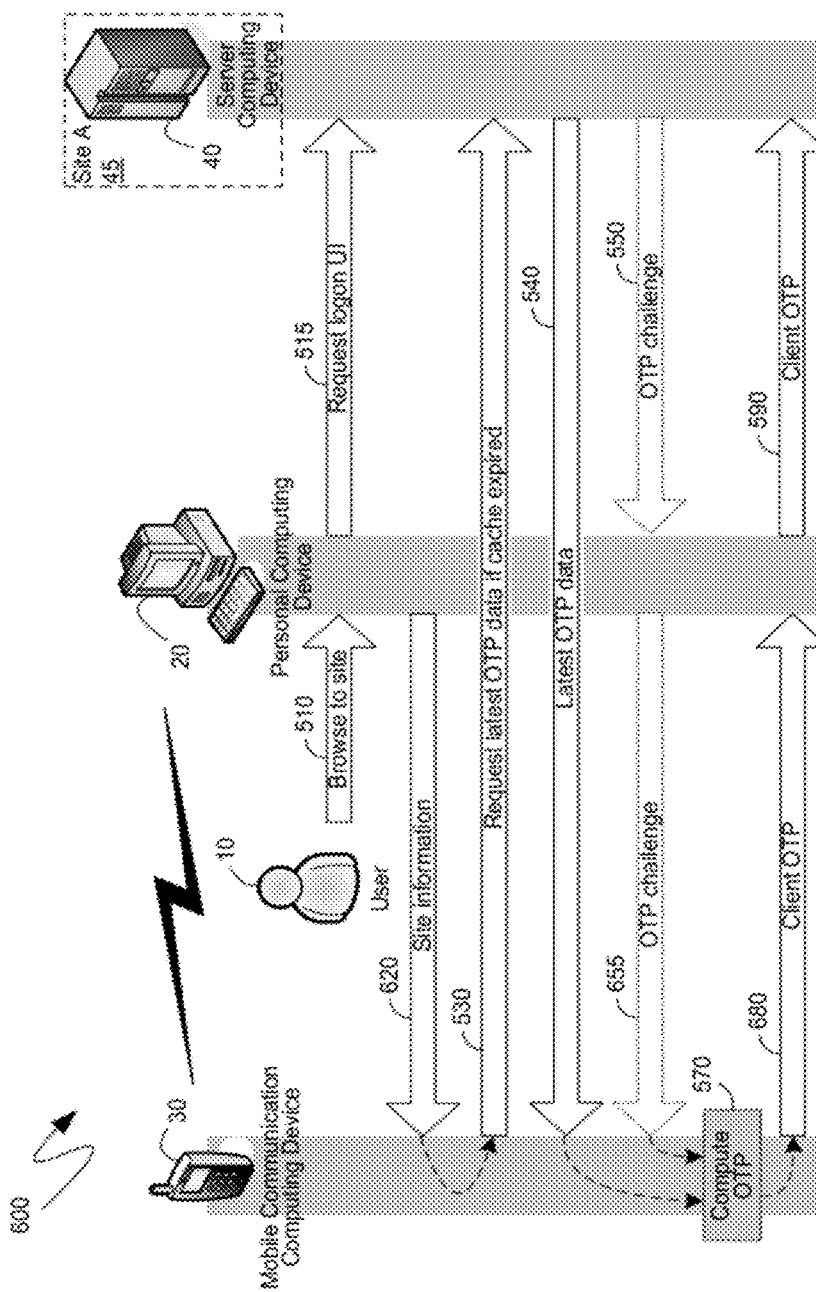
FIG. 7 is a communicational diagram of another exemplary utilization of single use secrets.

In another embodiment, if the personal computing device 20 which is executing the application program that the user 10 is using to communicate with the site 45 is a trusted computing device which the user will allow to establish a communicational connection to the user's mobile device 30, additional efficiencies can be realized, and the actions of the user can be minimized. Turning to FIG. 7, the system 600 illustrates such a communicational connection between the personal computing device 20 and the user's mobile device 30. For example, the personal computing device 20 of the system 600 can be the computing device owned by the user 10 for their personal use. As such, the user 10 may maintain sufficient control over the personal computing device 20 to enable, and trust, the communicational connection between it and the mobile device 30. As before, such a communicational connection can be a wireless or wired connection.

As in the system 500 of FIG. 6, the user 10 can, as again shown by the arrow 510, utilize application programs executing on the personal computing device 20 to browse to the site 45, which can, in turn, cause those application programs to issue request 515 to the server computing device 40 for a logon user interface. In the system 600, however, rather than the user 10 interacting with the mobile device 30 to provide information about the site 45 which the user is attempting to log on to, application programs executing on the personal computing device 20 can utilize the communicational connection between it and the mobile device, and can provide the relevant information to the mobile device via the communication 620 without any action on the part of the user.

With the provided information, the mobile device 30 can, as described previously, request the latest OTP data from the server computing device 40 via the communication 530 and can receive it via communication 540. Again, as before, if appropriate, the server computing device 40 can provide an OTP challenge via communication 550. While the OTP challenge can, as before, be sent directly to the mobile device 30, it can, in another embodiment, be provided to applications executing on the personal computing device 20. In such a case, rather than having the user 10 read the OTP challenge from such applications' user interface and manually enter it into the mobile device 30, the applications can, instead utilize the communicational connection between the mobile device and the personal computing device 20 and can provide the OTP challenge, via communication 655, to the mobile device without action on the part of the user.

As before, the mobile device 30 can compute an OTP as part of activity 570, such as in the manner described in detail above. However, once computed, the mobile device can, via communication 680, provide such an OTP directly to applications executing on the personal computing device 20 via the communicational connection between them. The applications executing on the personal computing device 20 can then, as before, provide the OTP to the server computing device 40 via communication 590, thereby enabling the user 10 to be logged on to the site 45. As can be seen, therefore, from the perspective of the user 10, in an embodiment where the mobile device 30 is communicationally coupled to the personal computing device 20, the user can simply browse to the site 45 and the user's password can be automatically entered into the appropriate fields and provided to the site without additional effort on the part of the user.

Figure 8:
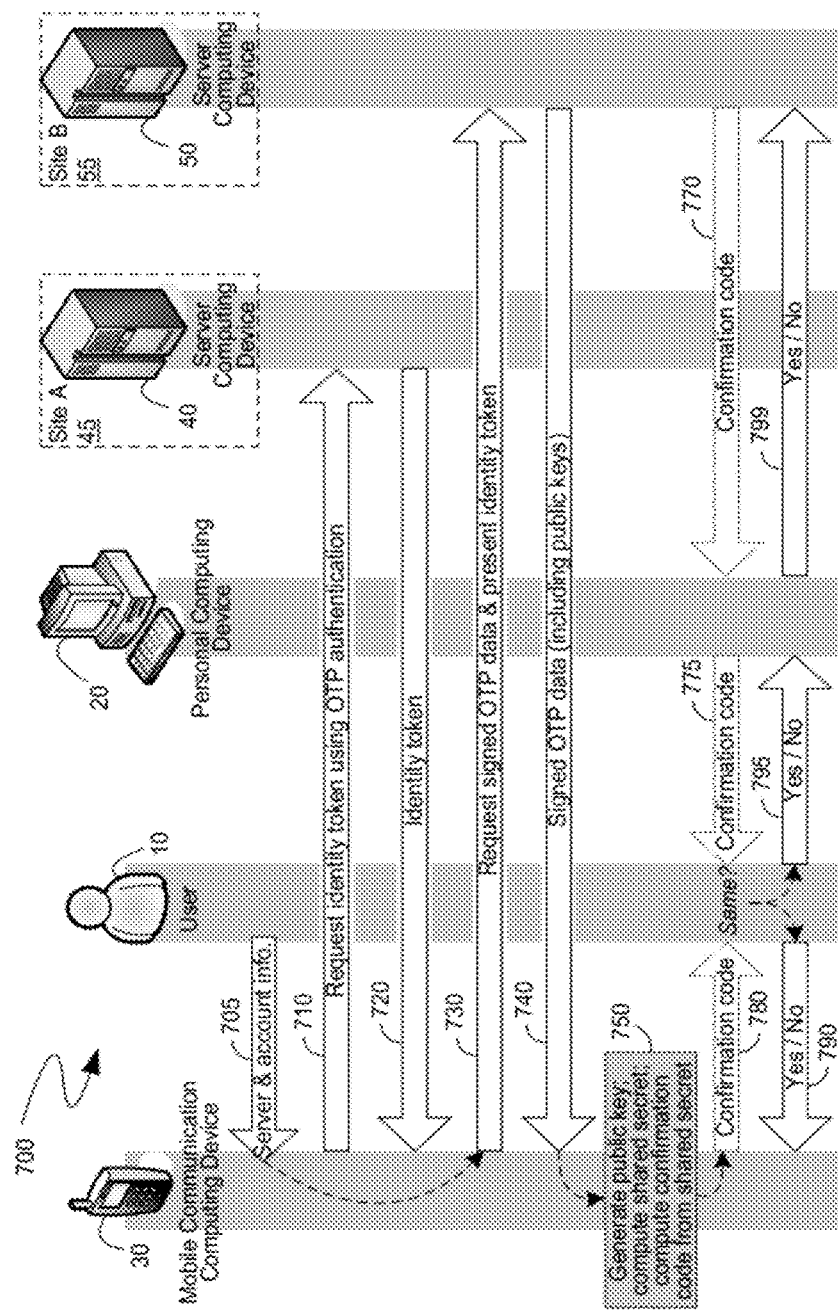
FIG. 8 is a communicational diagram of a still other exemplary series of communications by which the generation of single use secrets can be provisioned.

To provide efficiencies in establishing, and provisioning, multiple sites, such as the site 45, with the OTP capabilities of the mobile device 30, data from a site with which the mobile device has already provisioned an OTP mechanism can be utilized and provided to another site to enable a more efficient provisioning of an OTP mechanism with that other site. Turning to FIG. 8, the system 700 comprises not only the site 45 with which the mobile device 30 can already have provisioned an OTP mechanism, such as in the manner described in detail above, but also another site 55 independent of the site 45.

The user 10 can, as before, notify the mobile device 30, via entry 705, that the user wishes to provision an OTP mechanism for the user's account with the site 55. However, in system 700, the OTP key ring application executing on the mobile device 30 can already comprise an entry for the site 45. The new entry to be created for the site 55 can be a further entry since, as described, the mobile device 30 can act as a key ring comprising the capability to generate OTPs for multiple sites independently of one another.

Although not shown in FIG. 8, the user 10 can interact with one or more application programs executing on the personal computing device 20 to communicate with the site 55 in the same manner as previously described with reference to site 45. In particular, the user 10 can provide, via the applications executing on the personal computing device 20, notification to the site 55 that the user intends to attempt to provision an OTP mechanism for their account on the site.

Either in response to the user's entry 705, or independently thereof, the mobile device 30 can, at some point in time, request an "identity token" from the server computing device 40 of the site 45 with which the mobile computing device has already provisioned an OTP mechanism. The term "identity token" means any collection of data by which one site can vouch, to another site, that a specific set of information is correct. In the instant case, the identity token can comprise the public key of the mobile device 30 that was previously provided to the server computing device 40, and which, furthermore, was proven to the server computing device to be proper based on the mobile device's possession of the corresponding private key and, thus, the successful establishment of the shared secret. As will be described further below, rather than repeating the above described mechanisms, the mobile device 30 can simply utilize an identity token from a site with which it has already provisioned an OTP mechanism to establish its public key with another site, thereby rendering the process of provisioning an OTP mechanism with that other site more efficient.

Returning to the system 700 of FIG. 8, the request 710 for the identity token can be sent from the mobile device 30 to the server computing device 40 of the site 45 within the context of an OTP registration. More particularly, the mobile device 30 can provide, as part of the request 710, an OTP that can be authenticated by the server computing device 40, such as in the manner described above. If the OTP is authenticated, then the server computing device 40 can provide the identity token back to the mobile device 30 via communication 720.

Upon receipt of the user's entry 705 indicating server and account information relevant to the provisioning of an OTP mechanism with the site 55, the mobile device 30 can request signed OTP data from the server computing device 50 of the site 55 in the same manner as described above with reference to the server computing device 40 of the site 45. In addition, however, the request 730 for the signed OTP data can further comprise the presentation of the previously obtained identity token.

In response to the request 730 for the signed OTP data, the server computing device 50 can provide the signed OTP data, which can, as described in detail above, comprise various alternative combinations of parameters, associated public keys of the server computing device, and other like information. The mobile device 30 can, as also described in detail above, select a set of parameters, utilize the corresponding public key of the server computing device 50 to generate a shared secret, and compute a confirmation code utilizing the shared secret. In one embodiment, because the identity token presented to the server computing device 50 already comprises a public key of the mobile device 30 based on a set of parameters, the mobile device 30 can simply select the same parameters from among those provided in the signed OTP data and utilize the corresponding public key of the server computing device to generate the shared secret.

The server computing device 50, on the other hand, need not wait for additional information from the mobile device 30. Instead, the provided identity token can provide, to the server computing device 50, the public key of the mobile device 30 within a trusted context such that the server computing device 50 requires no additional verification thereof Consequently, once the server computing device 50 receives the identity token, it can proceed to also generate the shared secret, such as in the manner described in detail above, from the mobile device's public key specified therein. The server computing device 50 can then, optionally, generate a confirmation code from the shared secret, as also described above.

The confirmation code optionally generated by the mobile device 30 can be compared to the confirmation code generated by the server computing device 50. In one embodiment, such a comparison can be performed by the user 10. Thus, as shown in the system 700, the user 10 can obtain the confirmation code from the mobile device 30, as indicated by the arrow 780, such as through a traditional display or other audio-visual user interface mechanism. The user 10 can, likewise, receive the confirmation code calculated by the server computing device 50 from an application program executing on the personal computing device 20, as indicated by the communication 770 from the server computing device to the personal computing device, and then the further arrow 775 from the personal computing device to the user. The user 10 can then indicate to the mobile device 30, via the entry 790, and to the server computing device 50, via communications 795 and 799, whether the confirmation codes matched. As before, if they matched, the OTP mechanism between the mobile device 30 and the site 50 can be considered to be provisioned. As described above, because utilization of the confirmation code is a mere confirmation, it can, in specific embodiments, be optional. To illustrate its optional nature, the communications 770, 775 and 780 are shown in FIG. 8 with dashed lines.

Although not specifically illustrated in FIG. 8, if the mobile device 30 and the personal computing device 20 were communicationally connected, the optional comparison of the confirmation codes, as well as other steps, could be automated and rendered more efficient, such as in the manner described in detail above. In either case, however, the new entry for the OTP mechanism between the mobile device 30 and the site 55 is based on the private and public keys of the server computing device 50 and, as such, is different from the OTP mechanism provisioned between the mobile device and the server computing device 40. As a result, the site 45 cannot compromise the account of the user 10 on the site 55, since the OTP provided, from the mobile device 30, for the site 45 will, necessarily, be different than the OTP provided, from the mobile device 30, for the site 55.

Figure 9:
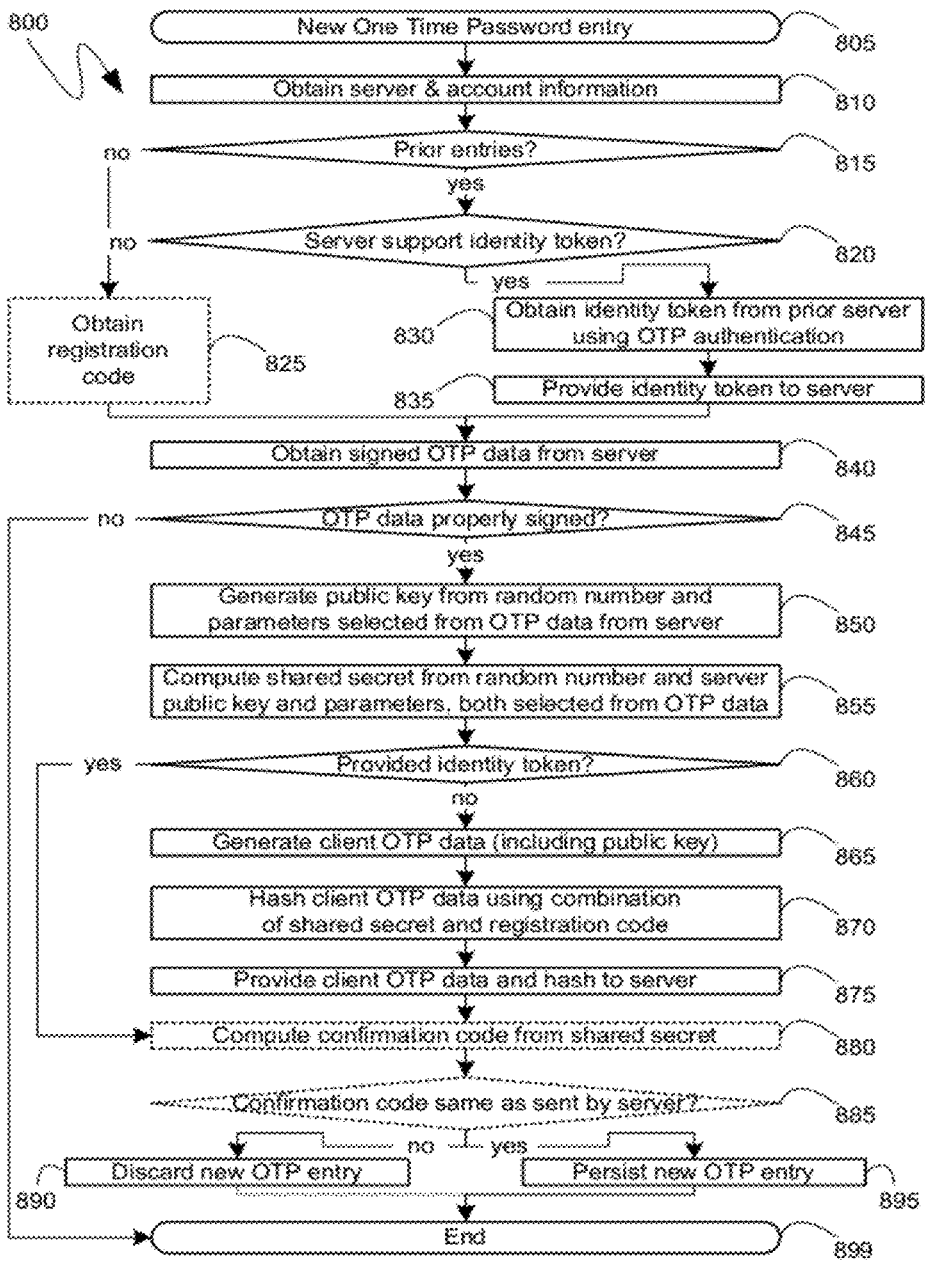
FIG. 9 is a flow diagram of an exemplary provisioning of the generation of single use secrets.

The operations of the mobile device 30 are described in further detail with reference to the flow diagram 800 of FIG. 9. Turning to FIG. 9, as can be seen, initially, at step 805, the mobile device 30 can receive an instruction to create a new OTP entry, such as from the user 10, or from one or more application programs executing on the personal computing device 20 to which the mobile device is communicationally coupled. Subsequently, at step 810, the mobile device 30 can receive information regarding the site to be associated with the new OTP entry, such as, for example, the network location of one or more server computing devices hosting the site, account information associated with the user 10, and other like information.

At step 815, the mobile device 30 can determine whether prior OTP entries exist. If no such entries exist, then the mobile device 30 may not be able to request an identity token and processing can proceed with step 825. If, however, at step 815, the mobile device 30 has prior OTP entries, then, it can proceed to, at step 820, determine if the server computing device associated with the new OTP entry from step 805 supports identity tokens. The determination of step 815 is illustrated strictly for illustrative simplicity as occurring in response to step 810. As will be recognized by those skilled in the art, the determination of step 815 can occur at any time prior to steps 820 or 825, including during a time prior to the request to create a new OTP entry at step 805.

If the mobile device 30 determines, at step 820, that the server associated with the new OTP entry does support identity tokens, then it can proceed, at step 830, to request and obtain an identity token from a server associated with a prior OTP entry, such as in the manner described in detail above with reference to the system 700. The identity token received from such a server can then, at step 835, be provided to the server associated with the new OTP entry from step 805. As with step 815, the obtaining of an identity token at step 830 is illustrated as occurring after step 820 for illustrative simplicity. As will be recognized by those skilled in the art, much in the same way that the determination of whether other OTP entries exist of step 815 can be performed at any time prior to step 820, including prior to the creation of a new OTP entry at step 805, the obtaining of an identity token can, likewise, be performed at any time prior to step 835, including prior to the creation of the new OTP entry of step 805, so long as the mobile device 30 has already determined, at step 815, that other OTP entries, from which such an identity token can be requested, actually exist.

If the mobile device 30 determines, at step 815, that there are no prior OTP entries, or if the mobile device determines, at step 820, that the server computing device associated with the new OTP entry of step 805 does not support identity tokens, then the mobile device can proceed to step 825, wherein it can, optionally, receive a registration code, such as that described in detail above. Step 825 of FIG. 9 is shown with dashed lines to indicate that it is optional.

Subsequently, whether the mobile device 30 has provided, at step 835, an identity token to the server associated with the new OTP entry of step 805, or whether the mobile device has received the registration code at step 825, processing can proceed at step 840 wherein the mobile device can request, and obtain, the signed OTP data from the server, such as illustrated and described previously. At step 845, the mobile device 30 can verify whether the OTP data it received from the server was properly signed. In one embodiment, the signed OTP data received from the server can be signed such that the mobile device can verify, at step 845, that the data was properly signed by examining the certificate of the site associated with the server. In another embodiment, the signed OTP data can be signed with reference to the network address, or other unique identifying information about the server computing device that can have been provided to the mobile device 30 by, for example, the user at step 810, such that the mobile device can utilize the information provided at step 810 to verify the signature at step 845.

If the mobile device 30 was not able to verify, at step 845, that the signed OTP data received at step 840 was properly signed, then the relevant processing can end at step 899 as shown. If, however, the received OTP data was properly signed, then the mobile device 30 can proceed to, at step 850, select from among the parameters and other data, presented as alternatives in the signed OTP data, and then generate its public key, both in the manner described in detail above. At step 855, the mobile device 30 can utilize the parameters selected at step 850, as well as associated data, such as the server public key associated with those parameters, to compute a shared secret, again in the manner described in detail above.

If the mobile device 30 had, at step 835, provided an identity token to the server, then processing can skip to the optional computation of a confirmation code from the shared secret at step 880. If, however, the mobile device 30 had not provided an identity token to the server, then at step 865, the mobile device can generate client OTP data, which can, as described previously, include the parameters selected, the mobile device's public key, and other like information relevant to the provisioning of an OTP mechanism between the server and the mobile device. The determination, at step 860, of whether the mobile device 30 provided an identity token, is shown for illustrative clarity and is not meant to represent a specific determination performed by the mobile device, but rather is meant to illustrate two alternative sets of steps and the reason why either such set of steps may be performed.

After the mobile device 30 has generated the client OTP data at step 865, it can proceed to hash that data at step 870. In one embodiment, as indicated previously, the client OTP data can be hashed by a concatenation, or other combination, of the shared secret computed at step 855 and the registration code that was received at step 825, or merely the shared secret computed at step 885 if the optional step 825 was not performed. A combination of the client OTP data from step 865 and the hash thereof, obtained at step 870, can be provided to the server at step 875. Subsequently, at step 880, the mobile device 30 can, optionally, compute a confirmation code from the shared secret derived at step 855. As indicated by the flow diagram 800, if the mobile device 30 had provided an identity token at step 835, then it can skip steps 865, 870 and 875, and proceed to the optional computation of the confirmation code at step 880. As described previously, in one embodiment, the confirmation code can be an OTP as would have been derived if the OTP mechanism was already provisioned.

If, at step 885, the mobile device 30 determines, or is informed, that the confirmation code from step 880 is the same as that provided by the server, then, at step 895, the OTP mechanism with the site associated with the new entry of step 805 can be considered to have been properly provisioned and the relevant information can be persisted. Subsequently, relevant processing can end at step 899. If, however, at step 885, the mobile device 30 determines, or is informed, that the confirmation code from step 880 is different than that provided by the server, the new OTP entry of step 805 can be discarded at step 890, since the OTP mechanism may not have been provisioned properly, and relevant processing can end at step 899. As before, steps 880 and 885 are shown in FIG. 9 with dashed lines to indicate that they are optional.

Figure 10:
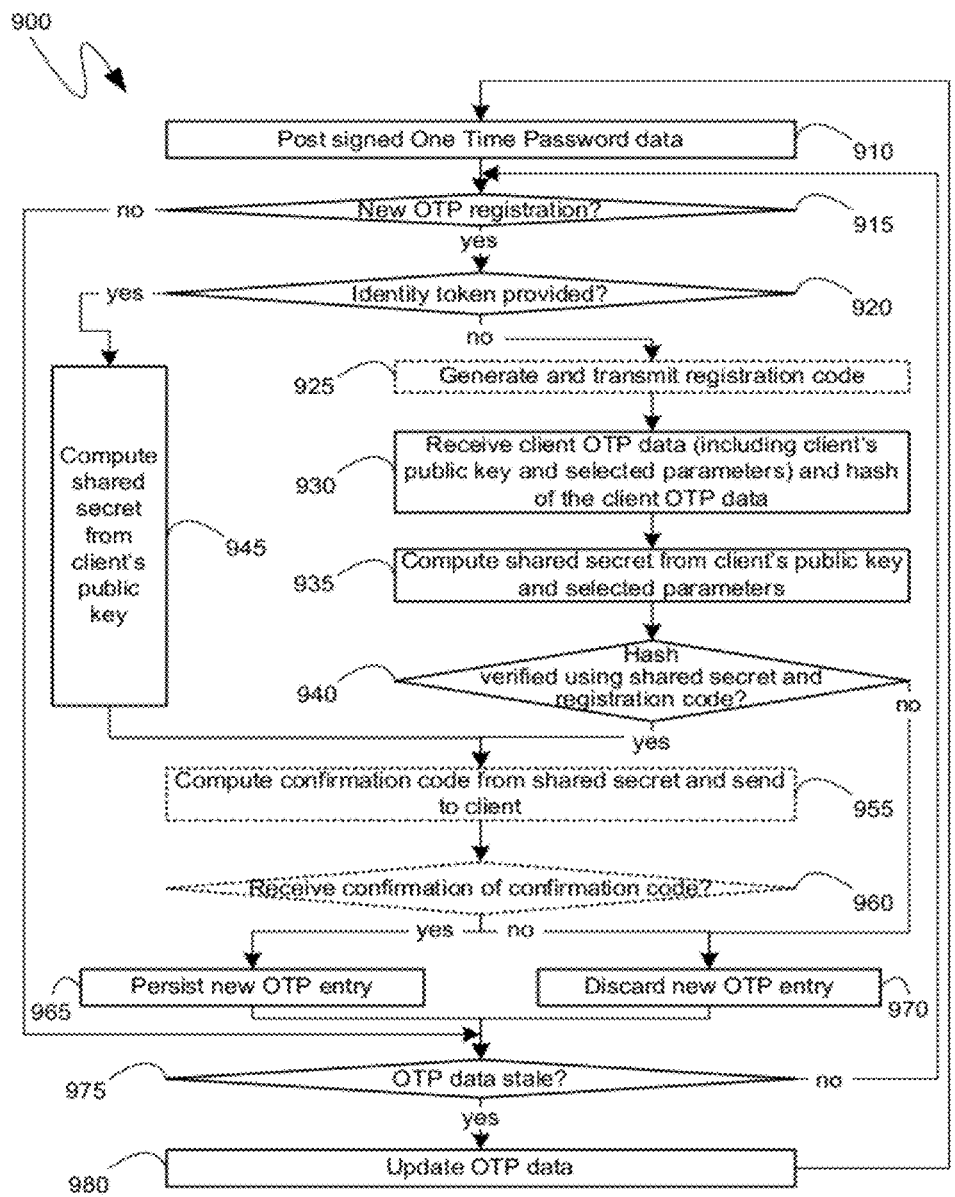
FIG. 10 is a flow diagram of another aspect of an exemplary provisioning of the generation of single use secrets.

A server computing device, such as those described above, can perform an analogous series of steps in attempting to provision an OTP mechanism for a user 10 of the site which the server computing device is hosting, or with which it is otherwise associated. Turning to FIG. 10, the flow diagram 900 illustrates an exemplary series of steps that a server computing device can perform in provisioning OTP mechanisms. Initially, as shown, the server computing device can post signed OTP data at step 910. As described previously, the signed OTP data can comprise alternative sets of parameters, associated public keys of the server computing device, and other like alternative data from among which the recipient can select to initiate provisioning an OTP mechanism with the server computing device. As also described previously, the OTP data posted can include signatures thereof to enable the recipient to verify that the data is, in fact, from the server computing device to which the recipient was directed.

At step 915, the server computing device can determine if it has received a request for a new OTP registration. If it has not yet received such a request, processing can skip to step 975, and the server computing device can determine, at step 975, whether the OTP data it posted at step 910 is stale or otherwise should be changed or updated. If the server computing device determines, at step 975, to update the OTP data, it can do so at step 980. In such a manner, as indicated previously, the server computing device can dynamically change the parameters of the OTP generation mechanism, even with already registered OTP clients, since such clients can, as described above, obtain such data from the server computing device prior to generating an OTP in accordance with an already provisioned OTP mechanism. If the server computing device updates the OTP data at step 980, processing can return to step 910, wherein the server computing device can post the updated OTP data. If, on the other hand, the server computing device determines, at step 975, that no update to the OTP data was appropriate, processing can return to step 915. In such a manner, the processing of the server computing device can continually monitor for new OTP registrations at step 915, and for the need to update the OTP data at step 975.

If, at step 915, the server computing device detects, or is informed of, a new OTP registration, then at step 920, the server computing device can determine whether an identity token was provided. If such an identity token was provided at step 920, then the server computing device can trust the client's public key, as specified in the identity token, for the reasons described above, and can proceed to, at step 945, to compute a shared secret from the client's public key as specified in the identity token.

If no identity token was received at step 920, the server computing device can, at step 925, optionally generate and transmit a registration code which can be utilized subsequently, to eliminate fraudulent, malicious, or otherwise improper requests for an OTP registration. Since step 925 is optional, it is shown in FIG. 10 with dashed lines. At step 930, the server computing device can receive, from the client, the client OTP data, which, as indicated previously, can comprise the client's public key, the selected parameters from which the client's public key was computed, other relevant data, and a hash of the client OTP data. Once the server computing device receives the client's information at step 930, it can proceed, at step 935, to compute a shared secret based on the information provided by the client at step 930. At step 940, then, the server computing device can verify the hash received at step 930 based on the registration code the server computing device sent at step 925, and the shared secret the server computing device computed at step 935. If the hash received at step 930 is not verified at step 940, the OTP provisioning can be considered to have failed, and information associated with that particular provisioning attempt can be discarded at step 970. Alternatively, if, at step 940, the hash received at step 930 is verified by the server computing device, the server computing device can proceed to, at step 955, the optional computation of a confirmation code, such as in the manner described in detail above, and that the transmission thereof to the client.

The optional computation of the confirmation code at step 955 can, likewise occur, after the server computing device computes the shared secret from the client's public key in an identity token at step 945. Subsequently, at step 960, the server computing device can receive confirmation of whether the confirmation code it computed at step 955 matched that independently computed by the client. If, at step 960, the server computing device receives a confirmation of the confirmation code, then the data regarding the new OTP entry can be persisted at step 965 and the OTP mechanism with the client can be considered to be properly provisioned. If, however, at step 960, the server computing device receives an indication that the confirmation code it computed at step 955 does not match that independently computed by the client, then at step 970, as indicated, the server computing device can discard the data associated with the new OTP entry, as the OTP provisioning can be considered to have failed. In either case, processing can then proceed with step 975, as described previously. As before, steps 955 and 960 are shown in FIG. 10 with dashed lines to indicate that they are optional.

As can be seen from the above descriptions, mechanisms for provisioning multiple independent single use passwords on a single device have been presented. In view of the many possible variations of the subject matter described herein, we claim as our invention all such embodiments as may come within the scope of the following claims and equivalents thereto.

We claim:

1. One or more computer-readable storage media, the one or more computer-readable storage media not consisting of a propagating signal, the one or more computer-readable storage media comprising computer-executable instructions for provisioning independent generation of single-use combinations of characters to aid in remote verification, the computer-executable instructions directed to steps comprising:

receiving, from a server computing device, multiple alternative sets of provisioning information, each alternative set of provisioning information comprising a set of parameters and a server computing device public key corresponding to that set of parameters that are both unique among the received multiple alternative sets of provisioning information;

selecting, from among the received multiple alternative sets of provisioning information, a single selected set of provisioning information;

creating a client public key from a randomly selected value that is a client private key and the parameters of the single selected set of provisioning information that was selected from among the received multiple alternative sets of provisioning information;

creating a shared secret from the client private key and the parameters and server computing device public key of the single selected set of provisioning information that was selected from among the received multiple alternative sets of provisioning information; and creating the single-use combination of characters from the shared secret.

2. The computer-readable storage media of claim 1, comprising further computer-executable instructions for establishing a communicational connection with a personal computing device and providing the single-use combination of characters to one or more application programs executing on the personal computing device and communicationally coupled to a remote entity associated with the server computing device.

3. The computer-readable storage media of claim 1, comprising further computer-executable instructions for displaying the single-use combination of characters to a user.

4. The computer-readable storage media of claim 1, comprising further computer-executable instructions for obtaining an identity token from another server computing device with which the independent generation of the single-use combinations of characters have already been provisioned and providing the identity token to the server computing device.

5. The computer-readable storage media of claim 1, comprising further computer-executable instructions for: receiving a registration code generated by the server computing device; providing client data to the server computing device, the client data comprising: the single selected set of provisioning information and the client public key; and providing a cryptographic verification of the client data to the server computing device, the cryptographic verification being based on a combination of the shared secret and the registration code.

6. The computer-readable storage media of claim 1, comprising further computer-executable instructions for: creating a first confirmation code from the share secret; receiving a second confirmation code generated by the server computing device; and determining that the provisioning the independent generation of the single-use combinations of characters was successful if the first confirmation code is equivalent to the received second confirmation code.

7. The computer-readable storage media of claim 1, comprising further computer-executable instructions for: receiving challenge data generated by the server computing device; creating response data from the challenge data and the shared secret; and transmitting the response data to the server computing device in response to the received challenge data to verify proper provisioning of the independent generation of the single-use combinations of characters.

8. The computer-readable storage media of claim 1, comprising further computer-executable instructions for: determining that the received multiple alternative sets of provisioning information have expired; requesting, in response to the determining, new multiple alternative sets of provisioning information; and repeating the receiving, the selected, the creating the client public key, the creating the shared secret, and the creating the single-use combination of characters with the new multiple alternative sets of provisioning information.

9. The computer-readable storage media of claim 1, wherein the single-use combination of characters is created from both the shared secret and a challenge issued by the remote entity.

10. One or more computer-readable storage media, the one or more computer-readable storage media not consisting of a propagating signal, the one or more computer-readable storage media comprising computer-executable instructions for provisioning independent generation of single-use combinations of characters to aid in remote verification, the computer-executable instructions directed to steps comprising:
creating a server computing device private key from a random value;
creating multiple alternative sets of provisioning information, each alternative set of provisioning information comprising a set of parameters and a server computing device public keys corresponding to that set of parameters that are both unique among the created multiple alternative sets of provisioning information;
providing the multiple alternative sets of provisioning information to a client; receiving, from the client, a single selected set of provisioning information, selected from among the multiple alternative sets of provisioning information, and a client public key;
creating a shared secret from the server computing device private key, the parameters of the received single selected set of provisioning information that was selected from among the multiple alternative sets of provisioning information, and the received client public key; and
creating the single-use combination of characters from the shared secret.

11. The computer-readable storage media of claim 10, comprising further computer-executable instructions for receiving an identity token comprising the received client public key, the identity token having been issued by a site with which the client has already provisioned the independent generation of the single-use combinations of characters.

12. The computer-readable storage media of claim 10, comprising further computer-executable instructions for creating a registration code and verifying a received cryptographic hash of the received single selected set of provisioning information and the received client public key with reference to the registration code and the shared secret.

13. The computer-readable storage media of claim 10, comprising further computer-executable instructions for: creating a first confirmation code from the shared secret; receiving a second confirmation code generated by client; and determining that the provisioning the independent generation of the single-use combinations of characters was successful if the first confirmation code is equivalent to the received second confirmation code.

14. The computer-readable storage media of claim 10, comprising further computer-executable instructions for: receiving a first single-use combination of characters generated by the client as a remote verification; generating challenge data; creating a second single-use combination of characters from the shared secret and the generated challenge data; an verifying the client if the first single-use combination of characters is equivalent to the second single-use combination of characters.

15. The computer-readable storage media of claim 10, comprising further computer-executable instructions for creating new, updated multiple alternatives is of provisioning information after at least some of the multiple alternative sets of provisioning information have expired; and repeating the receiving, the creating the shared secret and the creating the single-use combination of characters with the new, updated multiple alternative sets of provisioning information.

16. A system for providing protected information to at least one user, the system comprising:
a server computing device associated with a site providing at least some of the protected information, the server computing device comprising a first shared secret from which single-use combinations of characters are created and multiple alternative sets of provisioning information, each alternative set of provisioning information comprising a set of parameters and a server computing device public key corresponding to that set of parameters that are both unique among the created multiple alternative sets of provisioning information, the server computing device generating the first shared secret based on a server computing device private key, a mobile computing device public key, and a single selected set of provisioning information that is selected from among the multiple alternative sets of provisioning information; and
a mobile computing device utilized by the at least one user to generate a single-use combination of characters to verify the at least one user to the site, the mobile computing device comprising a second shared secret, equivalent to the first shared secret, from which the single-use combination of characters is created, the mobile computing device selecting the single set of provisioning information from among the multiple alternative sets of provisioning information and generating the second shared secret based on a mobile computing device private key and the single selected set of provisioning information that was selected by the mobile computing device from among the multiple alternative sets of provisioning information, the mobile computing device generating the second shared secret independently of the server computing device's generation of the first shared secret.

17. The system of claim 16, wherein the mobile computing device further comprises computer-executable instructions for performing steps comprising: receiving, from the server computing device, the multiple alternative sets of provisioning information; selecting, from among the received multiple alternative sets of provisioning information, the single selected set of provisioning information;

creating the mobile computing device public key from a randomly selected value that is the mobile computed device private key and the parameters of the single selected set of provisioning information that was selected from among the received multiple alternative sets of provisioning information and, creating the second shared secret from the mobile computing device private key and the parameters and see server computing device public key of the single selected set of provisioning information that was selected from among the received multiple alternative sets of provisioning information; and wherein further the server computing device further comprises computer-executable instructions for performing steps comprising: creating the server computing device private key from another random value; creating the multiple alternative sets of provisioning information; receiving, from the mobile device, the single selected set of provisioning information and the mobile computing device public key and; creating the first shared secret from the server computing device private key, the parameters of the received single selected set of provisioning information, and the received mobile computing device public key.

18. The system of claim 16, wherein the first shared secret is created by the server computing device using a public key of the mobile computing device provided to the server computing device via an identity token; the system further comprising a second server computing device associated with a second site providing more of the protected information, wherein the mobile computing device has already provisioned a single-use combination of characters generation mechanism with the second site, the second server computing device comprising the identity token.

19. The system of claim 16, further comprising a personal computing device utilized by the at least one user to access the protected information through the site, the personal computing device comprising a communicational connection with the mobile computing device and one or more application programs for accessing the protected information through the site, the one or more application programs comprising computer-executable instructions for obtaining the single-use combination of characters from the mobile device through the communicational connection.

20. The system of claim 16, further comprising a personal computing device associated with the site, the personal computing device comprising a communicational connection with the mobile device and a provisioning application program comprising computer-executable instructions for providing, to the mobile device through the communicational connection, provisioning information comprising at least one public key of the server computing device.

* * * * *